US 9,680,599 B2

(12) United States Patent
Kakande

(10) Patent No.: US 9,680,599 B2
(45) Date of Patent: Jun. 13, 2017

(54) MULTICHANNEL DATA TRANSPORT SUITABLE FOR DIRECT OPTICAL DETECTION AT THE RECEIVER

(71) Applicant: Alcatel-Lucent USA Inc., Murray Hill, NJ (US)

(72) Inventor: Joseph K. Kakande, Jersey City, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 81 days.

(21) Appl. No.: 14/863,550

(22) Filed: Sep. 24, 2015

(65) Prior Publication Data

US 2016/0119078 A1  Apr. 28, 2016

Related U.S. Application Data

(60) Provisional application No. 62/069,139, filed on Oct. 27, 2014, provisional application No. 62/069,144, filed on Oct. 27, 2014.

(51) Int. Cl.
*H04J 14/06* (2006.01)
*H04B 10/50* (2013.01)
(Continued)

(52) U.S. Cl.
CPC ............ *H04J 14/06* (2013.01); *H04B 10/506* (2013.01); *H04B 10/5053* (2013.01);
(Continued)

(58) Field of Classification Search
CPC ........ H04J 14/02; H04J 14/06; H04B 10/6166
(Continued)

(56) References Cited

U.S. PATENT DOCUMENTS 6,388,786 B1 * 5/2002 Ono ..................... H04B 10/505
375/291
8,218,979 B2  7/2012 Liu
(Continued)

OTHER PUBLICATIONS

Nishihara, M., et al. "Comparison of discrete multi-tone and pulse amplitude modulation for beyond 100 Gbps short-reach application." SPIE OPTO. International Society for Optics and Photonics, 2013.
(Continued)

*Primary Examiner* — Don N Vo
(74) *Attorney, Agent, or Firm* — Mendelsohn Dunleavy, P.C.; Yuri Gruzdkov

(57) ABSTRACT

We disclose an optical transport system configured to transport the same data using two different channels of an optical transport link in a manner that enables an optical receiver to use direct detection of the optical power received through each of the two channels to measure the in-phase and quadrature components of the modulating electromagnetic field. In an example embodiment, an optical carrier of the modulated optical signal transported using the first of the two channels and an optical carrier of the modulated optical signal transported using the second of the two channels have a fixed relative phase offset of approximately 90 degrees. The resulting ability of the optical receiver to measure each of the in-phase and quadrature components of the modulating electromagnetic field advantageously enables the optical receiver to perform electronic signal equalization, including but not limited to electronic dispersion compensation.

20 Claims, 9 Drawing Sheets

(51) Int. Cl.
*H04B 10/516* (2013.01)
*H04B 10/67* (2013.01)
*H04B 10/69* (2013.01)
*H04J 14/02* (2006.01)

(52) U.S. Cl.
CPC .......... *H04B 10/516* (2013.01); *H04B 10/67* (2013.01); *H04B 10/69* (2013.01); *H04J 14/02* (2013.01)

(58) Field of Classification Search
USPC .......................................................... 398/65
See application file for complete search history.

(56) References Cited

U.S. PATENT DOCUMENTS

| | | | |
|---|---|---|---|
| 8,320,769 B2 | 11/2012 | Essiambre et al. | |
| 8,355,638 B2 | 1/2013 | Essiambre et al. | |
| 8,494,368 B2 | 7/2013 | Xie et al. | |
| 2004/0184819 A1* | 9/2004 | Vassilieva | H04B 10/505 398/188 |
| 2007/0047964 A1* | 3/2007 | Ooi | H04B 10/66 398/147 |
| 2011/0217043 A1* | 9/2011 | Pfau | H04J 14/06 398/65 |
| 2012/0294622 A1* | 11/2012 | Holroyd | H04B 10/5051 398/131 |
| 2014/0356003 A1 | 12/2014 | Randel et al. | |
| 2015/0117872 A1* | 4/2015 | Lyubomirsky | H04J 14/06 398/205 |
| 2015/0256267 A1 | 9/2015 | Randel | |

OTHER PUBLICATIONS

Barros, D., et al. "Comparison of orthogonal frequency-division multiplexing and on-off keying in amplified direct-detection single-mode fiber systems." Journal of Lightwave Technology 28.12 (2010): 1811-1820.

Kamio, Y. et al. "80-Gb/s 256-QAM signals using phase noise and DGD-tolerant pilot-carrier-aided homodyne detection." ECOC 2007 (2007).

Chen, Y., et al. "Two Orthogonal Carriers Assisted 101-Gb/s Dual-Brand DDO-OFDM Transmission over 320-km SSMF," Optics Express, May 4, 2015, vol. 23, No. 9.

* cited by examiner

100

110

400

500

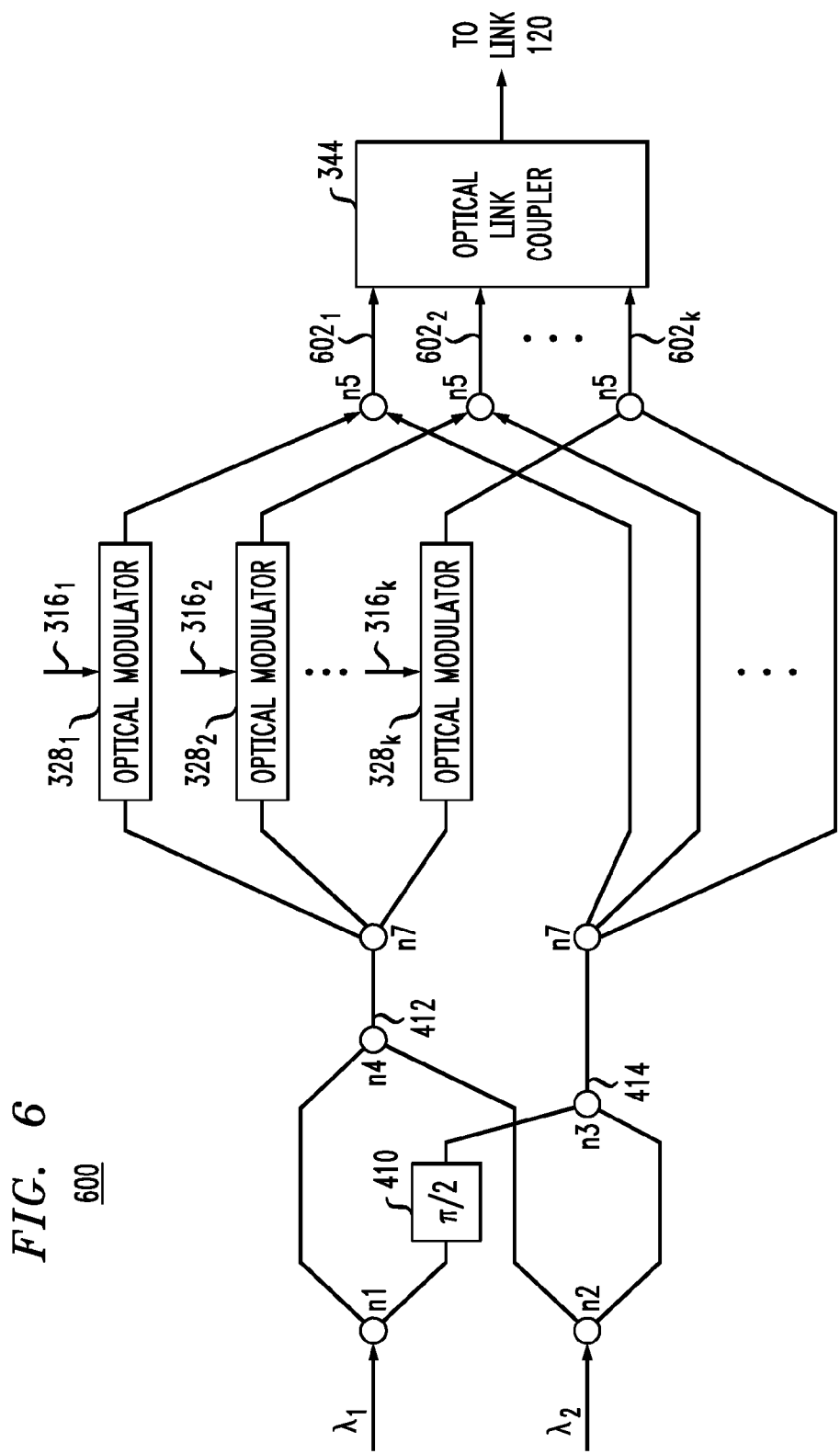

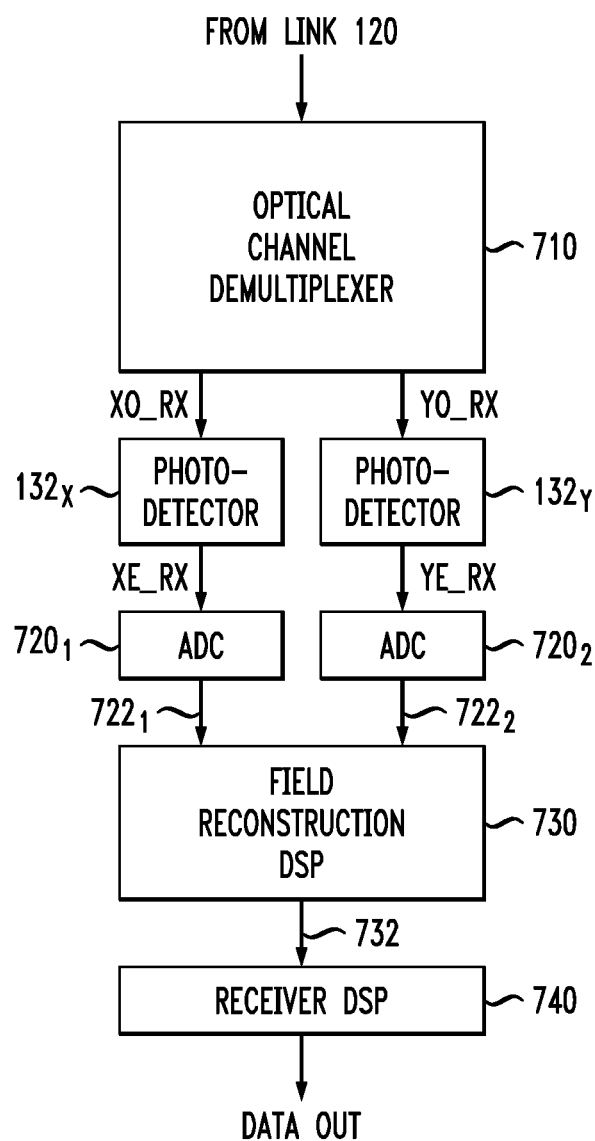

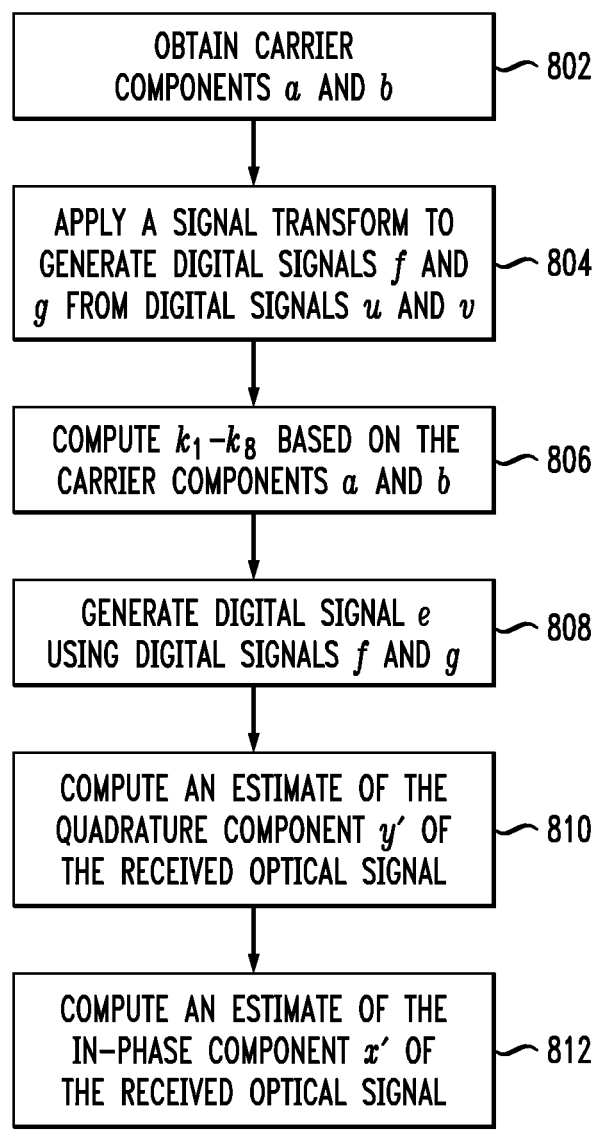

904

908

910

912

MULTICHANNEL DATA TRANSPORT SUITABLE FOR DIRECT OPTICAL DETECTION AT THE RECEIVER

CROSS-REFERENCE TO RELATED APPLICATIONS

This application claims the benefit of U.S. Provisional Patent Application No. 62/069,139, filed Oct. 27, 2014, and entitled "Single Quadrant Detection At Receiver Using Direct Detection And Wavelength Multiplexing Scheme For The Single Quadrant Detection."

This application also claims the benefit of U.S. Provisional Patent Application No. 62/069,144, filed Oct. 27, 2014, and entitled "Single Quadrant Detection At Receiver Using Direct Detection And Wavelength Multiplexing Scheme For The Single Quadrant Detection."

BACKGROUND

Field

The present disclosure relates to optical communication equipment and, more specifically but not exclusively, to multichannel data transport suitable for direct optical detection at the receiver.

Description of the Related Art

This section introduces aspects that may help facilitate a better understanding of the disclosure. Accordingly, the statements of this section are to be read in this light and are not to be understood as admissions about what is in the prior art or what is not in the prior art.

For relatively short (e.g., <100 km) optical links encountered in metro-area networks, direct (e.g., square-law) detection of optical signals may offer an attractive alternative to coherent detection because direct detection typically uses fewer active optical components than coherent detection and offers concomitant cost savings. However, adverse effects of chromatic dispersion (CD) may severely limit the maximum transmission distance achievable in direct-detection systems. It is therefore desirable to have an optical transport scheme that supports both direct detection and CD compensation at the receiver.

SUMMARY OF SOME SPECIFIC EMBODIMENTS

Disclosed herein are various embodiments of an optical transport system configured to transport the same data using two different channels of an optical transport link in a manner that enables the intended optical receiver to use direct detection of the optical power received through each of the two channels to measure the in-phase and quadrature components of the modulating electromagnetic field. In an example embodiment, an optical carrier of the modulated optical signal transported using the first of the two channels and an optical carrier of the modulated optical signal transported using the second of the two channels have a fixed relative phase offset of approximately 90 degrees. The resulting ability of the optical receiver to measure each of the in-phase and quadrature components of the modulating electromagnetic field advantageously enables the optical receiver to perform electronic signal equalization, including but not limited to electronic CD compensation.

In various embodiments, the two optical channels used for the data transport may be, for example, two different carrier wavelengths in the same optical fiber, two orthogonal polarizations of light in the same optical fiber, two different guided modes in the same multimode optical-fiber core, two different cores in the same multi-core fiber, or two different optical fibers in the same fiber-optic cable.

According to one embodiment, provided is an optical receiver comprising: (i) an optical detector that includes: an optical channel de-multiplexer configured to split a multiplexed optical signal into a first light beam encoded with first data and a second light beam encoded with the first data; a first photodetector configured to generate a first electrical signal proportional to optical power of the first light beam; and a second photodetector configured to generate a second electrical signal proportional to optical power of the second light beam; and (ii) a digital signal processor configured to receive the first and second electrical signals from the optical detector and generate therefrom an estimate of the first data by estimating each of an in-phase component and a quadrature component of an electromagnetic field that encodes the first data in each of the first and second light beams.

According to another embodiment, provided is an optical transmitter comprising:

an electrical-to-optical converter configured to generate (i) a first modulated optical signal having first data encoded therein and (ii) a different second modulated optical signal having the first data encoded therein in a manner that causes an optical carrier of the first modulated optical signal and an optical carrier of the second modulated optical signal to have a fixed relative phase offset of approximately $m\pi/2$ radian, where m is a positive or negative odd integer; and an optical interface configured to apply the first modulated optical signal to an optical transport link and apply the second modulated optical signals to said optical transport link.

According to yet another embodiment, provided is an optical communication method comprising: generating a first modulated optical signal having first data encoded therein for being optically transmitted using a first channel of an optical transport link; and generating a different second modulated optical signal having the first data encoded therein for being optically transmitted using a different second channel of the optical transport link. The steps of generating are performed in a manner that causes an optical carrier of the first modulated optical signal and an optical carrier of the second modulated optical signal to have a fixed relative phase offset of approximately $m\pi/2$ radian, where m is a positive or negative odd integer.

BRIEF DESCRIPTION OF THE DRAWINGS

Other aspects, features, and benefits of various disclosed embodiments will become more fully apparent, by way of example, from the following detailed description and the accompanying drawings, in which:

FIG. 6 shows a block diagram of an optical transmitter that can be used in the optical transport system of FIG. 1 according to another alternative embodiment;

FIG. 7 shows a block diagram of an optical receiver that can be used in the optical transport system of FIG. 1 according to an embodiment;

FIG. 8 shows a flowchart of a signal-processing method that can be used in the optical receiver of FIG. 7 according to an embodiment.

DETAILED DESCRIPTION

Figure 1:
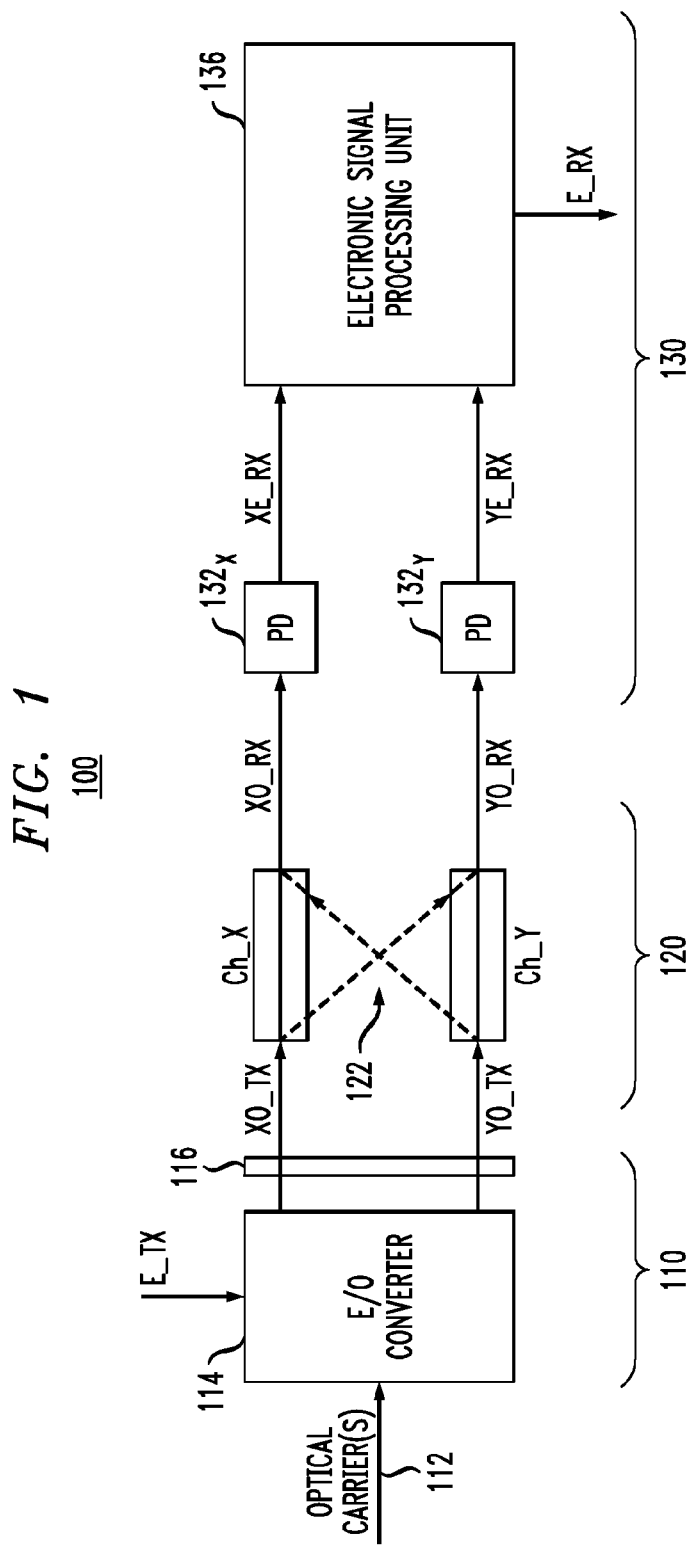
FIG. 1 shows a block diagram of an optical transport system according to an embodiment.

FIG. 1 shows a block diagram of an optical transport system 100 according to an embodiment. System 100 comprises an optical transmitter 110 and an optical receiver 130 that are optically connected via an optical transport link 120. Transmitter 110 is configured to optically transmit an input information signal (e.g., message or data stream) E_TX using two different channels of link 120, which channels are labeled in FIG. 1 as Ch_X and Ch_Y. Receiver 130 is configured to receive the corresponding optical signals through channels Ch_X and Ch_Y, convert the received optical signals into the corresponding electrical signals using photodetectors (PDs) 132$x$ and 132$y$, and electronically process these electrical signals to generate an output information signal E_RX. The electronic signal processing implemented in receiver 130 causes the output information signal E_RX to be a relatively accurate approximation of the input information signal E_TX, e.g., with the corresponding bit-error rate (BER) being smaller than an acceptable, relatively small fixed threshold value.

Transmitter 110 includes an electrical-to-optical (E/O) converter 114 configured to modulate an optical carrier 112 using the input information signal E_TX to generate optical output signals XO_TX and YO_TX. In an example embodiment, optical output signals XO_TX and YO_TX can be expressed using Eqs. (1)-(2):

$$XO\_TX = x + jy + C \quad (1)$$

$$YO\_TX = x + jy + jC \quad (2)$$

where x and y are the in-phase and quadrature signal components, respectively, of the transmitted electromagnetic field; and C is the optical carrier 112. Note that the optical carriers in optical output signals XO_TX and YO_TX have a relative phase shift of 90 degrees, which is mathematically expressed by the factor j applied to the optical carrier C in Eq. (2).

In some alternative embodiments, the optical carriers in optical output signals XO_TX and YO_TX may have a relative fixed phase shift that differs from 90 degrees, e.g., by about 30 degrees or less. However, a deviation of the relative fixed phase shift from 90 degrees may cause a concomitant BER penalty at the receiver. Nevertheless, provided that the value of the relative fixed phase shift is known or measured at optical receiver 130, an electronic signal-processing unit 136 therein can still be configured to properly estimate the modulating electromagnetic field. A person of ordinary skill in the art will understand how to appropriately modify the processing method used electronic signal-processing unit 136 to account for a deviation (if any) of the relative fixed phase shift from 90 degrees. In particular, the C=a+jb notation used for the carrier in the signal-processing method 800, which is described below in reference to FIG. 8, enables a relatively straightforward modification of the corresponding mathematical algorithm to arrive at an algorithm suitable for an arbitrary relative phase shift, e.g., selected from the interval between about 60 and 120 degrees.

In some embodiments, it may be beneficial to configure E/O converter 114 to generate optical output signals XO_TX and YO_TX using a modulation format in which the plurality of transmitted constellation symbols or points are located in a single quadrant of the complex plane defined with respect to optical carrier 112. An example of such a modulation format is a format that causes the values of x and y to be positive for all transmitted symbols, which corresponds to the symbols being located in the first quadrant of the complex plane. A person of ordinary skill in the art will understand that each of the other three quadrants can be used in a similar manner in alternative modulation formats. A suitable modulation format may be constructed, e.g., using a quadrature amplitude modulation (QAM) constellation, such as QAM-4 or QAM-16, or a pulse-amplitude modulation (PAM) constellation, such as PAM-2 or PAM-4.

In some embodiments, it may also be beneficial to operate system 100 in a regime in which the distorted constellation symbols actually received by optical receiver 130 are similarly located in a single quadrant of the complex plane. This regime can be entered, e.g., by optimizing the carrier-to-signal ratio for optical output signals XO_TX and YO_TX such that signal distortions associated with dispersion in link 120 do not cause the received constellation symbols to spill over into the neighboring quadrants.

E/O converter 114 is further configured to apply optical output signals XO_TX and YO_TX, via an optical interface 116, to optical channels Ch_X and Ch_Y, respectively, as indicated in FIG. 1. Example embodiments of E/O converter 114 and optical interface 116 are described in more detail below in reference to FIGS. 3-6.

In an example embodiment, optical transport link 120 may be implemented using a single-mode or multimode optical fiber, a multi-core optical fiber, or a fiber-optic cable having a plurality of optical fibers. In various embodiments, optical channels Ch_X and Ch_Y of link 120 may be, without undue limitation: (i) two different wavelength channels in the same optical fiber; (ii) two different (e.g., orthogonal) polarizations of light in the same optical fiber; (iii) two different spatial modes in the same multimode optical-fiber core; (iv) two different cores in the same multi-core fiber; or (v) two different optical fibers in the same fiber-optic cable. In some embodiments, link 120 may exhibit some amount of inter-channel crosstalk, as indicated in FIG. 1 by dashed arrows 122.

In operation, link 120 subjects optical signals XO_TX and YO_TX to various transmission impairments, such as chromatic dispersion (CD), thereby causing receiver 130 to receive, at the receiver end of the link, optical signals XO_RX and YO_RX that differ from the optical signals XO_TX and YO_TX originally transmitted by transmitter 110. In an example embodiment, optical signals XO_RX and YO_RX can be expressed using Eq. (3):

$$\begin{pmatrix} XO\_RX \\ YO\_RX \end{pmatrix} = \begin{pmatrix} k & l \\ m & n \end{pmatrix} \left( \begin{pmatrix} XO\_TX \\ YO\_TX \end{pmatrix} * h \right) \quad (3)$$

where k, l, m, and n are the elements of a 2×2 matrix U that mathematically describes inter-channel crosstalk in link 120;

the values of optical signals XO_TX and YO_TX are given by Eqs. (1)-(2), respectively; h is the transfer function corresponding to link 120; and the "*" sign denotes convolution. A person of ordinary skill in the art will understand that the transfer function h mathematically represents certain transmission impairments of link 120, including but not limited to CD.

Figure 2:
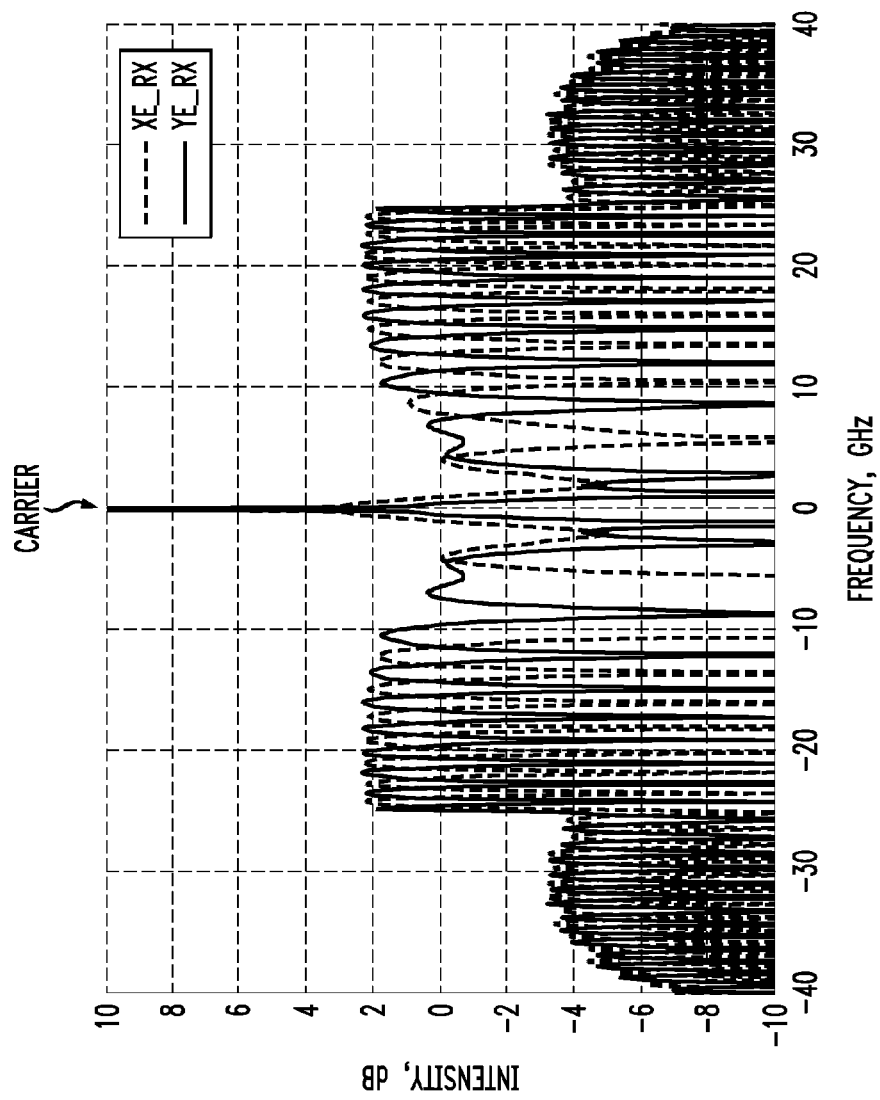
FIG. 2 graphically illustrates example electrical signals generated in the optical transport system of FIG. 1 according to an embodiment.

In an example embodiment, various relevant parameters and characteristics of optical signals XO_TX and YO_TX and/or optical channels Ch_X and Ch_Y may be selected such that the received optical signals XO_RX and YO_RX exhibit approximately orthogonal fading patterns, e.g., as illustrated in FIG. 2. Although transmission impairments typically cause the transmitted optical signals to lose some information in link 120, an approximate orthogonality of the fading patterns causes the received optical signals XO_RX and YO_RX not to have lost exactly the same information. This property advantageously enables receiver 130 to use a complementary nature of the resulting electrical signals to effectively perform electronic CD compensation and optional mitigation of other transmission impairments, e.g., as further illustrated by the example embodiments described herein. The electronic CD compensation, in turn, advantageously enables system 100 to transport data, with an acceptable BER, over a relatively long (e.g., ca. 100 km) link 120.

Photodetectors 132x and 132y operate to transform the received optical signals XO_RX and YO_RX into the corresponding electrical signals XE_RX and YE_RX, respectively. In an example embodiment, electrical signals XE_RX and YE_RX can be expressed using Eq. (4):

$$\begin{pmatrix} XE\_RX \\ YE\_RX \end{pmatrix} = \begin{pmatrix} |x' + jy' + C|^2 \\ |x' + jy' + jC|^2 \end{pmatrix} \equiv \begin{pmatrix} |XO\_RX|^2 \\ |YO\_RX|^2 \end{pmatrix} \quad (4)$$

where x' and y' are the in-phase and quadrature signal components, respectively, of the received optical signals XO_RX and YO_RX; C is the optical carrier; and the values of optical signals XO_RX and YO_RX are given by Eq. (3). A person of ordinary skill in the art will understand that electrical signals XE_RX and YE_RX represent the intensity of optical signals XO_RX and YO_RX, respectively, and are generated by photodetectors 132x and 132y using the square-law detection, also often referred to as direct detection.

FIG. 2 graphically illustrates example electrical signals XE_RX and YE_RX generated in system 100 (FIG. 1) according to an embodiment. More specifically, the electrical-signal spectra shown in FIG. 2 correspond to an input information signal E_TX having a rectangular spectrum (not shown) that occupies the spectral range from −25 GHz to +25 GHz with respect to the carrier. A person of ordinary skill in the art will understand that such rectangular spectra may be encountered, e.g., in optical orthogonal frequency-division multiplexing (OFDM) systems. The corresponding optical signals XO_TX and YO_TX are transmitted over link 120 comprising ~100 km of the single-mode optical fiber SMF-28 characterized by the group-velocity dispersion parameter D=17 ps/nm/km. The CD and other transmission impairments in this optical fiber cause electrical signals XE_RX and YE_RX generated at receiver 130 to have multiple spectral nulls illustrated by the spectra shown in FIG. 2. However, these spectra also indicate that (i) the spectral nulls of signal XE_RX are spectrally aligned with the spectral maxima of signal YE_RX and (ii) the spectral nulls of signal YE_RX are spectrally aligned with the spectral maxima of signal XE_RX. These spectral properties of signals XE_RX and YE_RX are a manifestation of the above-mentioned orthogonal fading patterns corresponding to optical channels Ch_X and Ch_Y, in this example, caused by the relative carrier-phase offset of 90 degrees between these two channels.

Referring back to FIG. 1, an electronic signal-processing unit 136 is configured to process electrical signals XE_RX and YE_RX to generate the output information signal E_RX. Example processing steps performed by electronic signal-processing unit 136 may include but are not limited to: (i) estimating the optical carrier C, the transfer function h, and the inter-channel crosstalk matrix U; (ii) determining the values of x' and y', e.g., by numerically solving Eq. (4); (iii) estimating the values of x and y, e.g., by numerically solving Eqs. (1)-(3); and (iv) recovering the data encoded in input information signal E_TX. Step (iii) may include the sub-step of performing electronic CD compensation in a manner similar to that used in conventional coherent detection systems. A person of ordinary skill in the art will understand that this type of CD-compensation processing is possible in system 100 in spite of the direct detection of optical signals at receiver 130 because, at step (ii), electronic signal-processing unit 136 can generate an estimate of the full modulating electromagnetic field, including both the phase and amplitude thereof. An example embodiment of a signal-processing algorithm that can be used in electronic signal-processing unit 136 is described in more detail below in reference to FIGS. 8-9.

Figure 3:
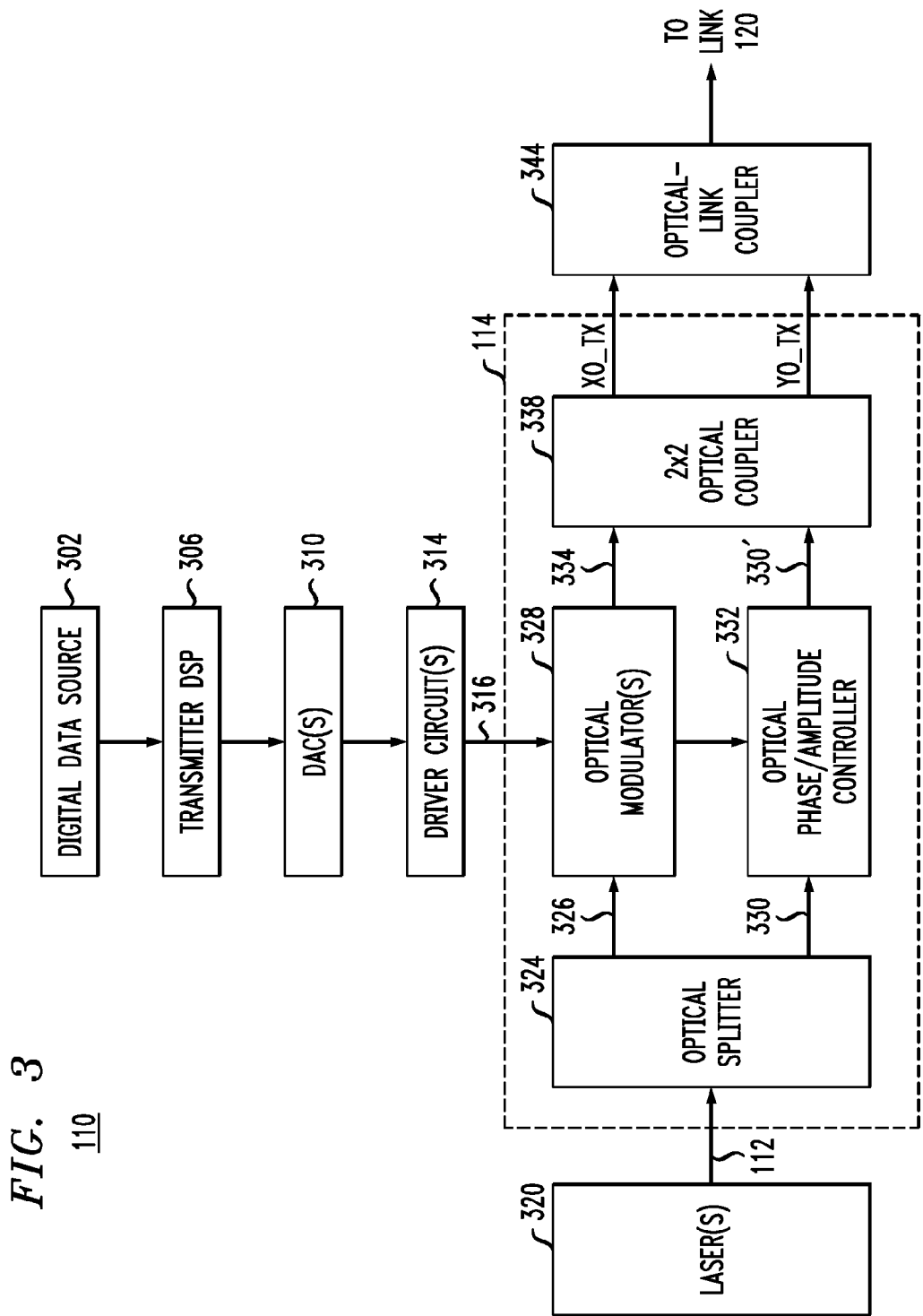
FIG. 3 shows a block diagram of an optical transmitter that can be used in the optical transport system of FIG. 1 according to an embodiment.

FIG. 3 shows a block diagram of optical transmitter 110 (FIG. 1) according to an embodiment. FIG. 3 also shows a block diagram of an example embodiment of E/O converter 114 (also see FIG. 1). Additional example embodiments of E/O converter 114 are shown and described in reference to FIGS. 3-6.

Transmitter 110 comprises one or more lasers 320 configured to generate one or more unmodulated optical carriers 112 (also see FIG. 1). The data to be transmitted by appropriately modulating the one or more optical carriers 112 are provided by a data source 302. In an example embodiment, data source 302 can be a communication interface connected to external circuits. A digital signal processor (DSP) 306 operates to appropriately process the data provided by data source 302 to transform them into a form suitable for being encoded in optical signals. Such data processing may include, but is not limited to: (i) introducing data redundancies to enable error correction at the receiver; (ii) optionally partitioning the provided data into two or more parallel data streams; (iii) mapping a data stream onto an operative constellation to generate a corresponding stream of constellation symbols; (iv) optionally applying pre-distortion to compensate possible signal distortions in the front end of the optical transmitter and/or receiver; and (v) optionally applying pre-compensation processing to mitigate adverse effects of certain transmission impairments in the optical transport link. One or more digital-to-analog converters (DACs) 310 operate to transform the one or more digital signals generated by DSP 306 into electrical analog form. Driver circuits 314 then appropriately bias and amplify the analog signals received from DACs 310 to generate one or more electrical drive signals 316 for driving one or more optical modulators 328 in E/O converter 114.

In the example embodiment shown in FIG. 3, E/O converter 114 comprises an optical splitter 324 configured to split the one or more optical carriers 112 into optical beams 326 and 330 and then apply these optical beams to the one or more optical modulators 328 and an optical phase/amplitude controller 332, as indicated in FIG. 3. The one or more optical modulators 328 use the one or more electrical drive signals 316 to appropriately modulate optical beam 326 to generate a modulated optical signal 334. In an example embodiment, the type of optical modulation applied in the one or more optical modulators 328 may cause the optical carrier(s) to be suppressed in modulated optical signal 334, with most of the optical power being carried by one or more modulation sidebands. Optical controller 332 operates to properly adjust the phase and amplitude of the optical carrier(s) in optical beam 330' to enable a passive 2×2 optical coupler 338 to combine it with the modulated optical signal 334 such that the resulting optical signals XO_TX and YO_TX have the desired relative phase relationship, e.g., as expressed by Eqs. (1)-(2). In an example embodiment, optical coupler 338 may be implemented using an optical 90-degree hybrid conventionally used in coherent optical receivers.

An optical-link coupler 344 is a part of optical interface 116 between transmitter 110 and optical transport link 120 that operates to appropriately couple optical signals XO_TX and YO_TX into the selected channels Ch_X and Ch_Y of the optical transport link. A person of ordinary skill in the art will understand that the physical structure of optical-link coupler 344 depends on the type of channels Ch_X and Ch_Y used in system 100. For example, when channels Ch_X and Ch_Y are the X and Y polarizations, respectively, in the same optical fiber, a conventional optical polarization combiner may be used as optical-link coupler 344. As another example, when channels Ch_X and Ch_Y are two different wavelength channels in the same optical fiber, a conventional 3-dB optical power combiner or a wavelength combiner may be used as optical-link coupler 344. As yet another example, when channels Ch_X and Ch_Y are two different spatial modes in the same multimode optical-fiber core, an optical mode coupler (OMC) may be used as optical-link coupler 344. Example embodiments of optical mode couplers suitable for this purpose are disclosed, e.g., in U.S. Pat. Nos. 8,355,638 and 8,320,769, both of which are incorporated herein by reference in their entirety. In some embodiments, optical-link coupler 344 is optional and may be omitted. Such embodiments may be used, e.g., when optical signals XO_TX and YO_TX are being directly coupled into two different cores of the same multi-core fiber or into two different optical fibers of the same fiber-optic cable.

Figure 4:
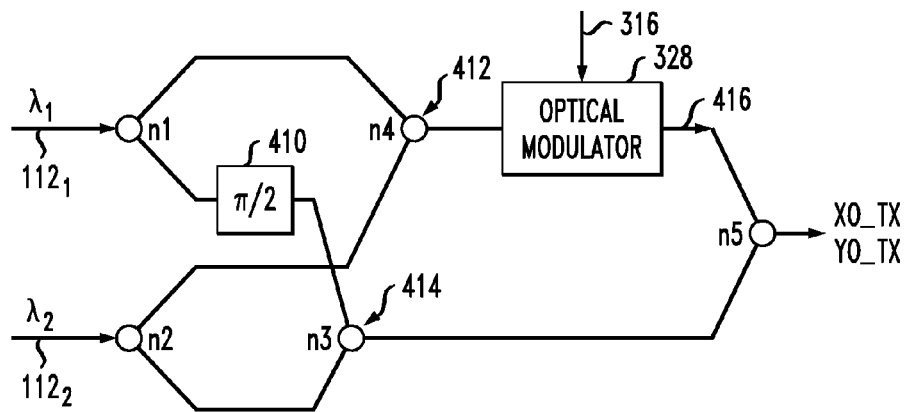
FIG. 4 shows a block diagram of an electrical-to-optical converter that can be used in the optical transmitter of FIG. 3 according to an alternative embodiment.

FIG. 4 shows a block diagram of an E/O converter 400 that can be used as E/O converter 114 (FIG. 1) according to an alternative embodiment. E/O converter 400 is designed for data transmission over two different wavelength channels, illustratively shown as corresponding to optical carrier wavelengths (frequencies) $\lambda_1$ ($\omega_1$) and $\lambda_2$ ($\omega_2$), respectively. Similar to the embodiment of E/O converter 114 shown in FIG. 3, E/O converter 400 employs optical modulator 328 driven by electrical drive signal 316. In an example embodiment, optical modulator 328 may be a conventional optical I-Q modulator. Some implementations of E/O converter 400 may benefit from the following relationship between the optical carrier frequencies $\omega_1$ and $\omega_2$:

$$|\omega_1 - \omega_2| \leq 2B \tag{5}$$

where B is the bandwidth of optical modulator 328.

E/O converter 400 comprises optical splitters n1 and n2 and optical combiners n3, n4, and n5 interconnected as indicated in FIG. 4. The four optical paths that connect optical splitters n1 and n2 to optical combiners n3 and n4 have approximately the same optical length. In addition, the optical path that connects optical splitter n1 to optical combiner n3 includes a phase shifter 410 configured to apply a fixed phase shift of about 90 degrees. In an alternative embodiment, phase shifter 410 may be configured to apply any phase shift defined by Eq. (6):

$$\Delta\phi \approx m\pi/2 \tag{6}$$

where m is a positive odd integer (i.e., m=1, 3, 5, . . . ). In some embodiments, phase shifter 410 may be placed in the optical path that connects optical splitter n2 to optical combiner n3 instead of the optical path that connects optical splitter n1 to optical combiner n3 as shown in FIG. 4. A person of ordinary skill in the art will understand that other alternative placements of phase shifter 410, e.g., in the other optical paths between optical splitters n1/n2 and optical combiners n3/n4 are also possible.

In an example embodiment, the above-described configuration of the optical paths between optical splitters n1 and n2 and optical combiners n3 and n4 causes the wavelength-division-multiplexed (WDM) signals $S_{412}$ and $S_{414}$ generated at an output port 412 of optical combiner n4 and an output port 414 of optical combiner n3, respectively, to be approximately described by Eqs. (7) and (8):

$$S_{412} = C_1 + C_2 \tag{7}$$

$$S_{414} = jC_1 + C_2 \tag{8}$$

where $C_1$ is the optical carrier having the wavelength $\lambda_1$, and $C_2$ is the optical carrier having the wavelength $\lambda_2$. The WDM signal $S_{412}$ is then modulated in optical modulator 328 in a manner that causes each of the WDM components $C_1$ and $C_2$ to be modulated with the same data encoded in electrical drive signal 316. A resulting modulated WDM signal 416 is combined in optical combiner n5 with the (unmodulated) WDM signal $S_{414}$ to generate multiplexed optical signals XO_TX and YO_TX at the output thereof. The optical paths from optical combiners n3 and n4 to optical combiner n5 have approximately the same length.

Figure 5:
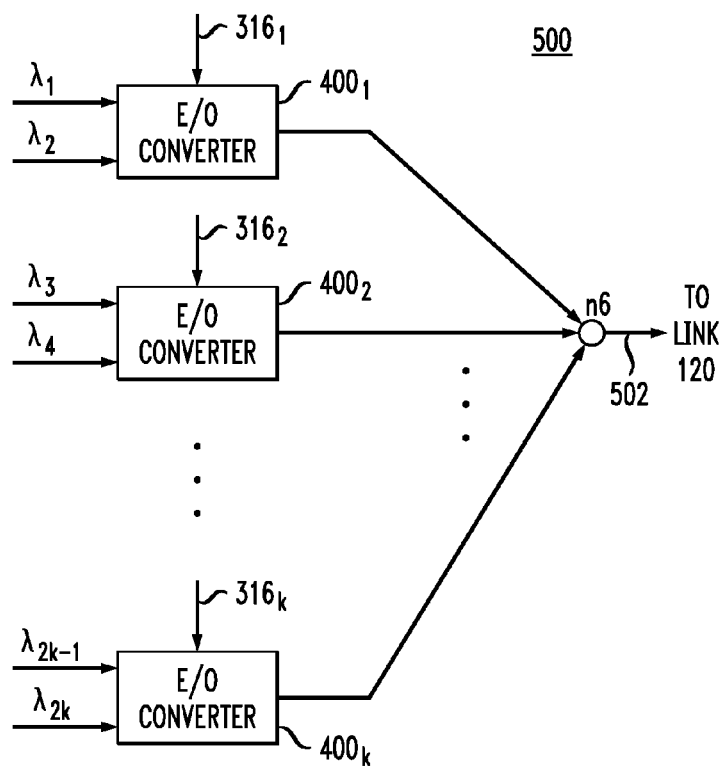
FIG. 5 shows a block diagram of an optical transmitter that can be used in the optical transport system of FIG. 1 according to an alternative embodiment.

FIG. 5 shows a block diagram of an optical transmitter 500 that can be used as optical transmitter 110 (FIG. 1) according to an alternative embodiment. More specifically, transmitter 500 is designed for data transmission over 2 k different wavelength channels of optical transport link 120 and, as such, is configured to use 2 k optical carriers having wavelengths $\lambda_1, \lambda_2, \ldots, \lambda_{2k}$, where k is a positive integer greater than 1. A person of ordinary skill in the art will understand that practical considerations may put an upper limit on the maximum value of k. In some embodiments, spectral separation between any two adjacent carrier wavelengths may be set in accordance with Eq. (5).

Transmitter 500 comprises k instances (nominal copies) of E/O converter 400 (also see FIG. 4), which are labeled in FIG. 5 as $400_1$-$400_k$. E/O converter $400_1$ is configured to use carrier wavelengths $\lambda_1$ and $\lambda_2$ and is driven by electrical drive signal $316_1$ having encoded therein a first data stream. E/O converter $400_2$ is configured to use carrier wavelengths $\lambda_3$ and $\lambda_4$ and is driven by electrical drive signal $316_2$ having encoded therein a second data stream different from the first data stream, and so on. As a result, transmitter 500 is capable of transmitting up to k different data streams over 2 k wavelength channels of optical transport link 120.

Transmitter 500 further comprises an optical combiner n6 configured to optically combine the output signals generated by E/O converters $400_1$-$400_k$ and apply the resulting wavelength-multiplexed optical signal 502 to an optical fiber in link 120. In an example embodiment, optical combiner n6 can be a WDM combiner or a wavelength multiplexer. In some embodiments, optical combiner n6 can be a k×1 optical power combiner.

FIG. 6 shows a block diagram of an optical transmitter 600 that can be used as optical transmitter 110 (FIG. 1) according to another alternative embodiment. More specifically, transmitter 600 is designed for data transmission over two different wavelength channels and k different optical paths of optical transport link 120, where k is a positive integer greater than 1. As a result, transmitter 600 is capable of transmitting up to k different data streams over optical transport link 120. In various embodiments, the k different optical paths in optical transport link 120 may be provided using: (i) k different spatial modes in the same multimode optical-fiber core; (ii) k different cores in the same multi-core fiber; or (iii) k different single-mode or multimode optical fibers in the same fiber-optic cable. A person of ordinary skill in the art will understand that, in some embodiments, any suitable combination of (i), (ii), and (iii) can also be used.

Similar to E/O converter 400 (FIG. 4), transmitter 600 uses carrier wavelengths $\lambda_1$ and $\lambda_2$ and comprises optical splitters n1 and n2, optical combiners n3 and n4, and a phase shifter 410 inserted in the optical path between optical splitter n1 and optical combiner n3. As a result, transmitter 600 generates at optical-combiner ports 412 and 414 two unmodulated WDM signals $S_{412}$ and $S_{414}$ approximately described by Eqs. (7) and (8), respectively. A first 1×k optical splitter n7 operates to optically split signal $S_{412}$ into k optical beams and apply each of these beams to a respective one of optical modulators $328_1$-$328_k$, as indicated in FIG. 6. Optical modulator $328_1$ is driven by electrical drive signal $316_1$ having encoded therein a first data stream. Optical modulator $328_2$ is driven by electrical drive signal $316_2$ having encoded therein a second data stream different from the first data stream, and so on. A second 1×k optical splitter n7 operates to optically split signal $S_{414}$ into k optical beams and apply each of these beams to a respective one of k optical combiners n5, as indicated in FIG. 6. Each optical combiner n5 also receives a respective modulated optical signal from a respective one of optical modulators $328_1$-$328_k$. The k optical signals $602_1$-$602_k$ generated by optical combiners n5 by optically combining their respective input signals are applied to optical link coupler 344, which operates to couple these optical signals into the respective different optical paths of optical transport link 120.

FIG. 7 shows a block diagram of an optical receiver 700 that can be used as optical receiver 130 (FIG. 1) according to an embodiment. Receiver 700 includes an optical channel de-multiplexer (DMUX) 710 that operates to direct light from channels Ch_X and Ch_Y of optical transport link 120 to photodetectors 132x and 132y, respectively (also see FIG. 1). A person of ordinary skill in the art will understand that the physical structure of optical channel DMUX 710 depends on the type of channels Ch_X and Ch_Y. In some embodiments, optical channel DMUX 710 is optional and may be omitted.

For example, when channels Ch_X and Ch_Y are the X and Y polarizations, respectively, in the same optical fiber, a conventional optical polarization DMUX may be used as optical channel DMUX 710. As another example, when channels Ch_X and Ch_Y are two different wavelength channels in the same optical fiber, a conventional wavelength DMUX may be used as optical channel DMUX 710. As yet another example, when channels Ch_X and Ch_Y are two different spatial modes in the same multimode optical-fiber core, an optical mode coupler (OMC) may be used as optical channel DMUX 710. Example embodiments of optical mode couplers suitable for this purpose are disclosed, e.g., in the above-cited U.S. Pat. Nos. 8,355,638 and 8,320,769.

Optical channel DMUX 710 may be omitted, e.g., when optical signals XO_RX and YO_RX can be directly applied to photodetectors 132x and 132y, respectively, as indicated in FIG. 1. Such embodiments may be used, e.g., when channels Ch_X and Ch_Y are carried using two different cores in the same multi-core fiber or two different optical fibers in the same fiber-optic cable.

Photodetectors 132x and 132y operate to transform the de-multiplexed optical signals XO_RX and YO_RX into the corresponding electrical signals XE_RX and YE_RX, respectively (also see FIG. 1). Analog-to-digital converters (ADCs) $720_1$ and $720_2$ operate to further transform electrical signals XE_RX and YE_RX into electrical digital form and apply the resulting electrical digital signals $722_1$ and $722_2$ to a field-reconstruction DSP 730. DSP 730 is configured to determine, in each time slot (symbol period), the in-phase component x' and the quadrature component y' of optical signals XO_RX and YO_RX (also see Eq. (4)) by appropriately processing electrical digital signals $722_1$ and $722_2$. An example signal-processing method suitable for this purpose is described in more detail below in reference to FIGS. 8-9. DSP 730 is further configured to output, via an electrical digital signal 732, the determined values of x' and y'. In some embodiments, electrical digital signal 732 may carry the values of x' and y' using a stream of digital complex values, x'+jy'.

A receiver DSP 740 operates to recover the data originally encoded in optical signals XO_TX and YO_TX (see FIG. 1) by processing the digital values received from DSP 730 via electrical digital signal 732. This processing may include, inter alia, CD compensation, timing recovery, equalization, demodulation, and error correction. Digital circuits and signal-processing algorithms that can be used to implement DSP 740 are disclosed, e.g., in commonly owned U.S. Patent Application Publication Nos. 2014/0356003 and 2015/0256267 and U.S. Pat. Nos. 8,218,979 and 8,494,368, all of which are incorporated herein by reference in their entirety.

In some embodiments, optical receiver 700 can be modified to enable reception and processing of optical signals transmitted over more than two channels of link 120, e.g., to be compatible with optical transmitters 500 (FIG. 5) and 600 (FIG. 6). An example modification for this purpose may include (i) replacement of the optical channel DMUX 710 shown in FIG. 7 by an optical channel DMUX configured for de-multiplexing light corresponding to more than two communication channels of link 120; (ii) adding more photodetectors 132, e.g., one additional photodetector per additional communication channel; and (iii) adding more ADCs 720, e.g., one additional ADC per additional photodetector 132.

FIG. 8 shows a flowchart of a signal-processing method 800 that can be used in optical receiver 700 (FIG. 7) according to an embodiment. Method 800 is based on an analytical solution to Eq. (4) expressed by Eqs. (9)-(10):

$$x' = \frac{1}{2(a+b)}\left(u - v - \frac{a-b}{2(a^2+b^2)}((a+b)P_2 + P_3)\right) \quad (9)$$

$$y' = -\frac{1}{4(a^2+b^2)}((a+b)P_2 + P_3) \quad (10)$$

-continued where:

$$P_2 \equiv \sqrt{\frac{-4a^4 - 8a^2b^2 + 4a^2u + 4a^2v - 4b^4 +}{4b^2u + 4b^2v - u^2 + 2uv - v^2}};$$

$P_3 \equiv 2a^3 + 2a^2b + 2ab^2 + au - av + 2b^3 - bu + bv;$ $u \equiv (XE\_RX);$ $v \equiv (YE\_RX);$ and $a + jb \equiv C.$ Note that electrical digital signals $722_1$ and $722_2$ provide a sequence of u values and a sequence of v values, respectively, wherein u and v vary over time, e.g., typically from one time slot to the next. In contrast, the values of a and b that characterize the carrier C are typically static or quasi-static.

FIGS. 9A-9D show block diagrams of digital circuitry that can be used in DSP 730 (FIG. 7) to carry out method 800 (FIG. 8) according to an embodiment. Method 800 is described below in reference to both FIGS. 8 and 9.

At step 802 of method 800, DSP 730 obtains the values of a and b.

In an embodiment where the carrier C is static (e.g., for all practical purposes, does not change over time), the values of a and b can be obtained by configuring optical receiver 700 to perform carrier estimation, e.g., as known in the art. The values of a and b measured in this manner can be saved in a non-volatile memory and then fetched therefrom at step 802.

In an embodiment where the carrier C is quasi-static (e.g., for all practical purposes, changes over time relatively slowly), the values of a and b can be obtained by configuring optical receiver 700 to perform carrier tracking. In different embodiments, carrier tracking can be performed either through dedicated hardware (e.g., a carrier-tracking feedback loop) in optical receiver 700 (not explicitly shown in FIG. 7) or by periodically repeating the sub-step of carrier estimation.

At step 804, DSP 730 applies a signal transform that converts digital signals u and v into digital signals f and g. Carrying out this transform includes performing the processing sub-steps of (i) de-skewing; (ii) scaling; and (iii) computing certain linear combinations of the de-skewed and scaled signals.

The sub-step of de-skewing is generally directed at eliminating any temporal misalignment (relative time delay, $t_d$) that might be present between digital signals u and v. The relative time delay $t_d$ between digital signals u and v may originate, e.g., from different signal-propagation times in different channels of link 120 and/or in the optical and electrical front end of optical receiver 700. The relative time delay $t_d$ can be measured or estimated in a relatively straight-forward manner, e.g., by performing receiver calibration. The de-skewing is then performed by digitally delaying, by delay time $t_d$, the leading one of digital signals u and v, thereby causing it to become temporally aligned with the lagging one of these two digital signals.

The sub-step of scaling is generally directed at compensating any gain differences in the different detection channels of optical receiver 700 that might distort the relative values of digital signals u and v. The scaling coefficients, $c_1$ and $c_2$, may be selected, e.g., to make the mean of the scaled signals to be approximately the same. In some embodiments, the sub-step of scaling may also be used to compensate for frequency-domain disparities experienced by digital signals u and v, in which case the scaling coefficients $c_1$ and $c_2$ become scaling vectors $c_1$ and $c_2$. The scalar multiplication is replaced in this case by the convolution operator, denoted by the "*" sign, to generate the following quantities: c1*u and c2*v, where u is a vector of u values, and v is a vector of v values over a plurality of signaling intervals. A person of ordinary skill in the art will understand that convolution in the time domain is equivalent to a component-by-component multiplication in the frequency domain.

The step of computing linear combinations is carried out in accordance with Eqs. (11)-(12) that define digital signals f and g as follows:

$$f = c1*u - c2*v \qquad (11)$$

$$g = c1*u + c2*v \qquad (12)$$

where f and g are the vectors having the values of f and g computed for the plurality of signaling intervals corresponding to the vectors u and v.

Figure 9A:
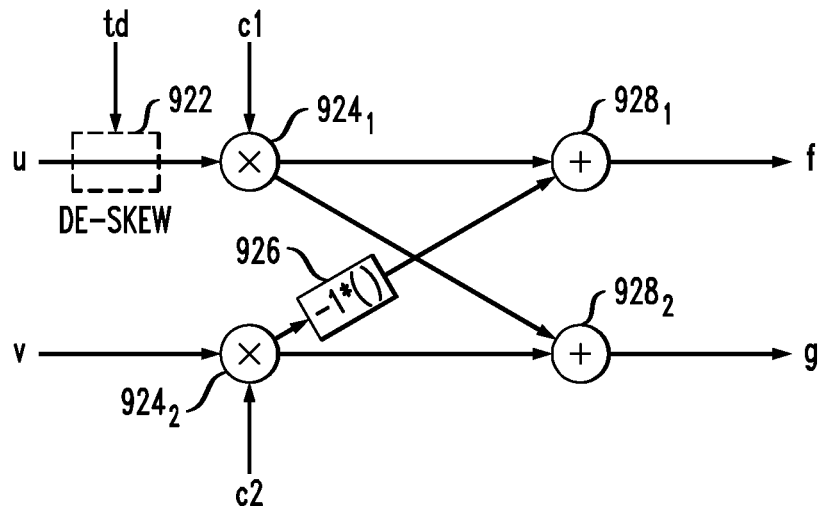
FIGS. 9A-9D show block diagrams of digital circuitry that can be used in the optical receiver of FIG. 7 to carry out the signal-processing method of FIG. 8 according to an embodiment.

FIG. 9A shows a block diagram of a digital circuit 904 that can be used in DSP 730 to implement step 804 according to an embodiment. More specifically, a configurable digital delay element 922 is configured to carry out the processing sub-step of de-skewing by applying the delay time $t_d$ to digital signal u. A person of ordinary skill in the art will understand that the shown circuit configuration is based on an implicit assumption that digital signal v lags with respect to digital signal u. A person of ordinary skill in the art will further understand that, when digital signal u lags with respect to digital signal v, de-skewing can be implemented in an analogous manner by delaying digital signal v. Multipliers $924_1$ and $924_2$ carry out the processing sub-step of scaling. A digital signal inverter 926 and adders $928_1$ and $928_2$ operate to generate linear combinations of the de-skewed and scaled signals in accordance with Eqs. (11) and (12).

At step 806, DSP 730 computes a plurality of values, $k_1$-$k_8$, based on the carrier components a and b in accordance with the following equations:

$$k_1 = a + b \qquad (13a)$$

$$k_2 = a^2 + b^2 \qquad (13b)$$

$$k_3 = a - b \qquad (13c)$$

$$k_4 = k_1/4k_2 \qquad (13d)$$

$$k_5 = -k_1/2 \qquad (13e)$$

$$k_6 = -k_3/4k_2 \qquad (13f)$$

$$k_7 = 1/2k_1 \qquad (13g)$$

$$k_8 = k_3/k_1 \qquad (13h)$$

At step 808, DSP 730 generates a digital signal e using the digital signals f and g generated at step 804 and the $k_2$ computed at step 806 in accordance with Eq. (14):

$$e = \sqrt{-4k_2^2 + 4k_2 g - f^2} \qquad (14)$$

Figure 9B:
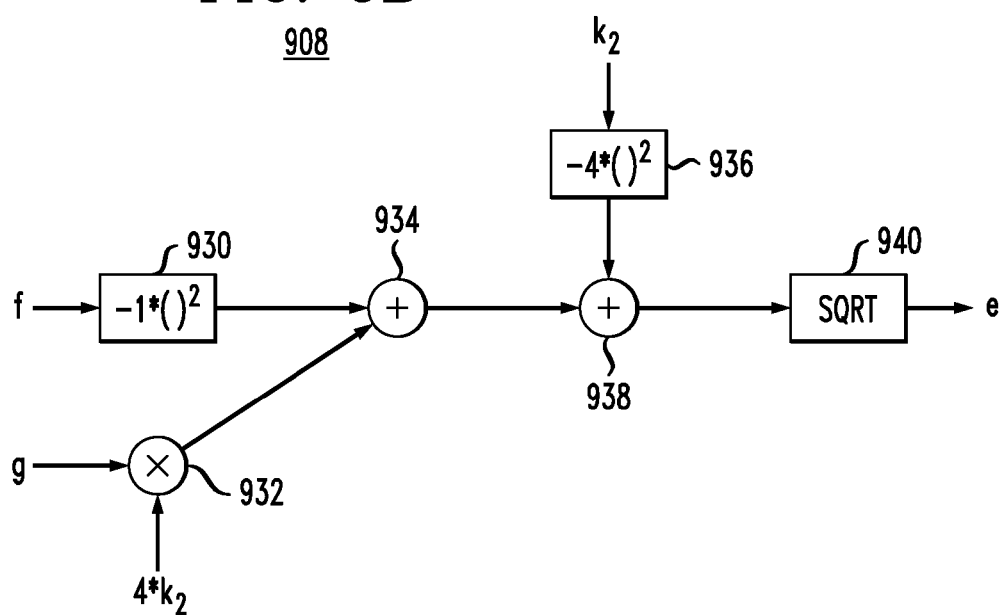

FIG. 9B shows a block diagram of a digital circuit 908 that can be used in DSP 730 to implement step 808 according to an embodiment. More specifically, processing blocks 930 and 936 and a multiplier 932 in circuit 908 operate to compute the third, second, and first terms, respectively, of the polynomial under the square root in Eq. (14). Adders 934 and 938 operate to generate a sum of these three terms. A SQRT block 940 then generates digital signal e by computing a square root of the sum generated by adders 934 and 938.

At step 810, DSP 730 computes the digital signal y' in accordance with Eq. (15):

$$y'=k_4 e+k_5+k_6 f \qquad (15)$$

It can be verified in a relatively straightforward manner that Eq. (15) implements Eq. (10).

Figure 9C:
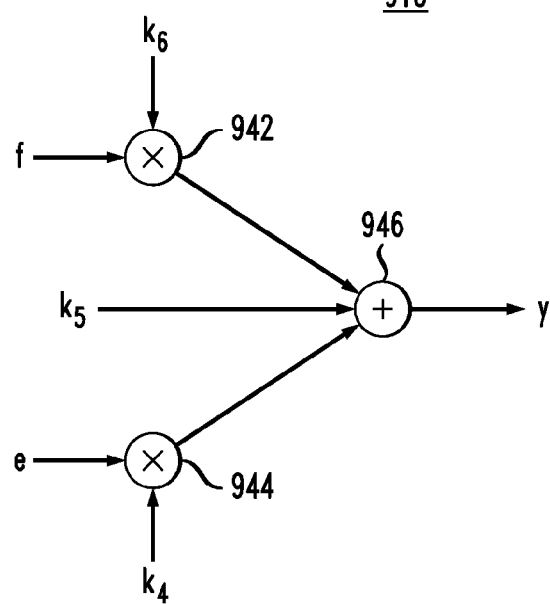

FIG. 9C shows a block diagram of a digital circuit 910 that can be used in DSP 730 to implement step 810 according to an embodiment. More specifically, multipliers 942 and 944 in circuit 910 operate to compute the third and first terms, respectively, of the linear combination shown in Eq. (15). An adder 946 then generates digital signal y' by summing the digital signals generated by multipliers 942 and 944 with the $k_5$ value computed at step 806.

At step 812, DSP 730 computes the digital signal x' in accordance with Eq. (16):

$$x'=k_7 f+k_8 y' \qquad (16)$$

It can be verified in a relatively straightforward manner that Eq. (16) implements Eq. (9).

Figure 9D:
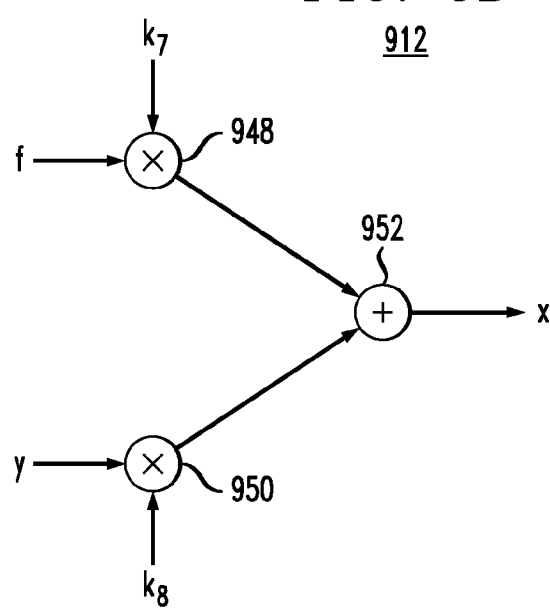

FIG. 9D shows a block diagram of a digital circuit 912 that can be used in DSP 730 to implement step 812 according to an embodiment. More specifically, multipliers 948 and 950 in circuit 912 operate to compute the first and second terms, respectively, of the linear combination shown in Eq. (16). An adder 952 then generates digital signal x' by summing the digital signals generated by multipliers 948 and 950.

According to an example embodiment disclosed above in reference to FIGS. 1-9, provided is an apparatus comprising: (i) an optical detector that includes: an optical channel de-multiplexer (e.g., 710, FIG. 7) configured to split a multiplexed optical signal into first and second light beams (e.g., XO_RX, YO_RX, FIG. 7), each encoded with first data; a first photodetector (e.g., 132x, FIG. 7) configured to generate a first electrical signal proportional to optical power of the first light beam; and a second photodetector (e.g., 132y, FIG. 7) configured to generate a second electrical signal proportional to optical power of the second light beam; and (ii) a digital signal processor (e.g., 136, FIGS. 1; 730 and 740, FIG. 7) configured to receive the first and second electrical signals from the optical detector and generate therefrom an estimate of the first data by estimating each of an in-phase component (e.g., x', Eq. (4)) and a quadrature component (e.g., y', Eq. (4)) of a modulating electromagnetic field that encodes the first data in each of the first and second light beams.

In some embodiments of the above apparatus, the digital signal processor is further configured to apply dispersion-compensation processing to estimates of the in-phase and quadrature components of the modulating electromagnetic field to generate the estimate of the first data.

In some embodiments of any of the above apparatus, the optical detector is configured to generate the first and second electrical signals without optically mixing any light of the first and second light beams with light of an optical local oscillator.

In some embodiments of any of the above apparatus, the optical channel de-multiplexer comprises a polarization beam splitter configured to split the multiplexed optical signal into the first and second light beams such that the first light beam has a first (e.g., X) polarization, and the second light beam has a second (e.g., Y) polarization approximately (e.g., to within ±10 degrees) orthogonal to the first polarization.

In some embodiments of any of the above apparatus, the optical channel de-multiplexer comprises a wavelength splitter configured to split the multiplexed optical signal into the first and second light beams such that an optical carrier of the first light beam has a first wavelength (e.g., $\lambda_1$), and that an optical carrier of the second light beam has a different second wavelength (e.g., $\lambda_2$).

In some embodiments of any of the above apparatus, the optical channel de-multiplexer comprises an optical mode coupler configured to split the multiplexed optical signal into the first and second light beams such that the first light beam receives light from a first optical mode of a multimode fiber, and the second light beam receives light from a different second optical mode of said multimode fiber.

In some embodiments of any of the above apparatus, the optical channel de-multiplexer is configured to generate the first light beam by directing thereto light from a first core of a multi-core fiber and to generate the second light beam by directing thereto light from a different second core of said multi-core fiber.

In some embodiments of any of the above apparatus, the optical channel de-multiplexer is configured to generate the first light beam by directing thereto light from a first optical fiber of a fiber-optic cable and to generate the second light beam by directing thereto light from a different second optical fiber of said fiber-optic cable.

According to another example embodiment disclosed above in reference to FIGS. 1-9, provided is an apparatus comprising: an electrical-to-optical converter (e.g., 114, FIGS. 1, 3; 400, FIGS. 4-5) configured to generate (i) a first modulated optical signal (e.g., XO_TX, FIG. 1) having first data (e.g., 316, FIG. 3) encoded therein and (ii) a different second modulated optical signal (e.g., YO_TX, FIG. 1) having the first data encoded therein in a manner that causes an optical carrier (e.g., $C_1$, Eq. (7)) of the first modulated optical signal and an optical carrier (e.g., $jC_1$, Eq. (8)) of the second modulated optical signal to have a fixed relative phase offset of approximately (e.g., to within ±30 degrees) mπ/2 radian, where m is a positive or negative odd integer; and an optical interface (e.g., 116, FIG. 1; 344, FIG. 3) configured to apply the first and second modulated optical signals to an optical transport link (e.g., 120, FIG. 1).

In some embodiments of the above apparatus, the electrical-to-optical converter is configured to generate the first modulated optical signal to have a first (e.g., X) polarization and the second modulated optical signal to have a second (e.g., Y) polarization approximately (e.g., to within ±10 degrees) orthogonal to the first polarization; and the optical interface comprises a polarization combiner configured to combine the first and second modulated optical signals to generate a polarization-division multiplexed signal for coupling into an optical core of the optical transport link.

In some embodiments of any of the above apparatus, the electrical-to-optical converter is configured to generate the first modulated optical signal to have a first optical carrier having a first wavelength (e.g., $\lambda_1$) and a second optical carrier having a second wavelength (e.g., $\lambda_2$) and to generate the second modulated optical signal to have a first optical carrier having the first wavelength (e.g., $\lambda_1$) and a second optical carrier having the second wavelength (e.g., $\lambda_2$) in a manner that causes: the first optical carrier of the first modulated optical signal and the first optical carrier of the second modulated optical signal to have the fixed relative phase offset of approximately mπ/2 radian; and the second optical carrier of the first modulated optical signal and the second optical carrier of the second modulated optical signal to have a fixed relative phase offset of approximately (e.g., to within ±10 degrees) 2 nπ radian, where n is an integer (e.g., consistent with Eqs. (7)-(8)).

In some embodiments of any of the above apparatus, the optical interface comprises a wavelength combiner configured to combine the first and second modulated optical signals to generate a wavelength-division multiplexed signal for coupling into an optical core of the optical transport link.

In some embodiments of any of the above apparatus, the electrical-to-optical converter is further configured to generate (i) a third modulated optical signal having second data (e.g., $316_2$, FIG. 5) encoded therein and (ii) a fourth modulated optical signal having the second data encoded therein in a manner that causes an optical carrier of the third modulated optical signal and an optical carrier of the fourth modulated optical signal to have a fixed relative phase offset of approximately pπ/2 radian, where p is a positive or negative odd integer; and the optical interface (e.g., n6, FIG. 5) is further configured to couple the third and fourth modulated optical signals into the optical transport link.

In some embodiments of any of the above apparatus, the electrical-to-optical converter is further configured to generate the third modulated optical signal to have a first optical carrier having a third wavelength (e.g., $\lambda_3$) and a second optical carrier having a fourth wavelength (e.g., $\lambda_4$) and to generate the fourth modulated optical signal to have a first optical carrier having the third wavelength and a second optical carrier having the fourth wavelength in a manner that causes: the first optical carrier of the third modulated optical signal and the first optical carrier of the fourth modulated optical signal to have the fixed relative phase offset of approximately pπ/2 radian; and the second optical carrier of the third modulated optical signal and the second optical carrier of the fourth modulated optical signal to have a fixed relative phase offset of approximately (e.g., to within ±10 degrees) 2 qπ radian, where q is an integer (e.g., consistent with Eqs. (7)-(8)).

In some embodiments of any of the above apparatus, the optical interface comprises an optical mode coupler configured to couple the first modulated optical signal into a first optical mode of a multimode fiber of the optical transport link and to couple the second modulated optical signal into a different second optical mode of said multimode fiber.

In some embodiments of any of the above apparatus, the optical interface is configured to couple the first modulated optical signal into a first core of a multi-core fiber of the optical transport link and to couple the second modulated optical signal into a different second core of said multi-core fiber.

In some embodiments of any of the above apparatus, the optical interface is configured to couple the first modulated optical signal into a first optical fiber of a fiber-optic cable of the optical transport link and to couple the second modulated optical signal into a different second optical fiber of said fiber-optic cable.

In some embodiments of any of the above apparatus, the electrical-to-optical converter comprises an optical modulator (e.g., 328, FIG. 3) configured to generate the first modulated optical signal using a constellation in which all constellation points are located in a single quadrant of a complex plane defined with respect to an optical carrier.

In some embodiments of any of the above apparatus, the apparatus further comprises an optical receiver (e.g., 130, FIG. 1; 700, FIG. 7) that comprises: an optical channel de-multiplexer (e.g., 710, FIG. 7) coupled to the optical transport link and configured to split light received therethrough from the electrical-to-optical converter into first and second light beams (e.g., XO_RX, YO_RX, FIG. 7), each encoded with the first data; a first photodetector (e.g., 132x, FIG. 7) configured to generate a first electrical signal proportional to optical power of the first light beam; a second photodetector (e.g., 132y, FIG. 7) configured to generate a second electrical signal proportional to optical power of the second light beam; and a digital signal processor (e.g., 730 and 740, FIG. 7) configured to receive the first and second electrical signals and generate therefrom an estimate of the first data by estimating each of an in-phase component and a quadrature component of a modulating electromagnetic field that encodes the first data in each of the first and second light beams.

According to yet another example embodiment disclosed above in reference to FIGS. 1-9, provided is an optical communication method comprising the steps of: generating a first modulated optical signal (e.g., XO_TX, FIG. 1) having first data (e.g., 316, FIG. 3) encoded therein for being optically transmitted using a first channel (e.g., Ch_X, FIG. 1) of an optical transport link; and generating a different second modulated optical signal (e.g., YO_TX, FIG. 1) having the first data encoded therein for being optically transmitted using a different channel (e.g., Ch_Y, FIG. 1) of the optical transport link. The steps of generating are performed in a manner that causes an optical carrier (e.g., $C_1$, Eq. (7)) of the first modulated optical signal and an optical carrier (e.g., $jC_1$, Eq. (8)) of the second modulated optical signal to have a fixed relative phase offset of approximately (e.g., to within ±10 degrees) mπ/2 radian, where m is a positive or negative odd integer.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
an optical detector that includes:
an optical channel de-multiplexer configured to split a multiplexed optical signal into a first light beam encoded with first data and a second light beam encoded with the first data;
a first photodetector configured to generate a first electrical signal proportional to optical power of the first light beam; and
a second photodetector configured to generate a second electrical signal proportional to optical power of the second light beam; and
a digital signal processor configured to receive the first and second electrical signals from the optical detector and generate therefrom an estimate of the first data by estimating each of an in-phase component and a quadrature component of an electromagnetic field that encodes the first data in each of the first and second light beams.

2. The apparatus of claim 1, wherein the digital signal processor is further configured to apply dispersion-compensation processing to estimates of the in-phase and quadrature components of the electromagnetic field to generate the estimate of the first data.

3. The apparatus of claim 1, wherein the optical detector is configured to generate the first and second electrical signals without optically mixing any light of the first and second light beams with light of an optical local oscillator.

4. The apparatus of claim 1, wherein the optical channel de-multiplexer comprises a polarization beam splitter configured to split the multiplexed optical signal into the first and second light beams such that the first light beam has a first polarization, and the second light beam has a second polarization approximately orthogonal to the first polarization.

5. The apparatus of claim 1, wherein the optical channel de-multiplexer comprises a wavelength splitter configured to split the multiplexed optical signal into the first and second light beams such that an optical carrier of the first light beam has a first wavelength, and that an optical carrier of the second light beam has a different second wavelength.

6. The apparatus of claim 1, wherein the optical channel de-multiplexer comprises an optical mode coupler configured to split the multiplexed optical signal into the first and second light beams such that the first light beam receives light from a first optical mode of a multimode fiber, and the second light beam receives light from a different second optical mode of said multimode fiber.

7. The apparatus of claim 1, wherein the optical channel de-multiplexer is configured to generate the first light beam by directing thereto light from a first core of a multi-core fiber and to generate the second light beam by directing thereto light from a different second core of said multi-core fiber.

8. The apparatus of claim 1, wherein the optical channel de-multiplexer is configured to generate the first light beam by directing thereto light from a first optical fiber of a fiber-optic cable and to generate the second light beam by directing thereto light from a different second optical fiber of said fiber-optic cable.

9. An apparatus comprising:
an electrical-to-optical converter configured to generate (i) a first modulated optical signal having first data encoded therein and (ii) a different second modulated optical signal having the first data encoded therein in a manner that causes an optical carrier of the first modulated optical signal and an optical carrier of the second modulated optical signal to have a fixed relative phase offset of approximately $m\pi/2$ radian, where m is a positive or negative odd integer; and an optical interface configured to apply the first modulated optical signal to an optical transport link and apply the second modulated optical signals to said optical transport link.

10. The apparatus of claim 9, wherein:

the electrical-to-optical converter is configured to generate the first modulated optical signal to have a first polarization and the second modulated optical signal to have a second polarization approximately orthogonal to the first polarization; and the optical interface comprises a polarization combiner configured to combine the first and second modulated optical signals to generate a polarization-division multiplexed signal for coupling into an optical core of the optical transport link.

11. The apparatus of claim 9, wherein the electrical-to-optical converter is configured to generate the first modulated optical signal to have a first optical carrier having a first wavelength and a second optical carrier having a second wavelength and to generate the second modulated optical signal to have a first optical carrier having the first wavelength and a second optical carrier having the second wavelength in a manner that causes:

the first optical carrier of the first modulated optical signal and the first optical carrier of the second modulated optical signal to have the fixed relative phase offset of approximately $m\pi/2$ radian; and the second optical carrier of the first modulated optical signal and the second optical carrier of the second modulated optical signal to have a fixed relative phase offset of approximately $2n\pi$ radian, where n is an integer.

12. The apparatus of claim 11, wherein the optical interface comprises a wavelength combiner configured to combine the first and second modulated optical signals to generate a wavelength-division multiplexed signal for coupling into an optical core of the optical transport link.

13. The apparatus of claim 11, wherein:

the electrical-to-optical converter is further configured to generate (i) a third modulated optical signal having second data encoded therein and (ii) a fourth modulated optical signal having the second data encoded therein in a manner that causes an optical carrier of the third modulated optical signal and an optical carrier of the fourth modulated optical signal to have a fixed relative phase offset of approximately $p\pi/2$ radian, where p is a positive or negative odd integer; and the optical interface is further configured to couple the third and fourth modulated optical signals into the optical transport link.

14. The apparatus of claim 13, wherein the electrical-to-optical converter is further configured to generate the third modulated optical signal to have a first optical carrier having a third wavelength and a second optical carrier having a fourth wavelength and to generate the fourth modulated optical signal to have a first optical carrier having the third wavelength and a second optical carrier having the fourth wavelength in a manner that causes:

the first optical carrier of the third modulated optical signal and the first optical carrier of the fourth modulated optical signal to have the fixed relative phase offset of approximately $p\pi/2$ radian; and the second optical carrier of the third modulated optical signal and the second optical carrier of the fourth modulated optical signal to have a fixed relative phase offset of approximately $2q\pi$ radian, where q is an integer.

15. The apparatus of claim 9, wherein the optical interface comprises an optical mode coupler configured to couple the first modulated optical signal into a first optical mode of a multimode fiber of the optical transport link and to couple the second modulated optical signal into a different second optical mode of said multimode fiber.

16. The apparatus of claim 9, wherein the optical interface is configured to couple the first modulated optical signal into a first core of a multi-core fiber of the optical transport link and to couple the second modulated optical signal into a different second core of said multi-core fiber.

17. The apparatus of claim 9, wherein the optical interface is configured to couple the first modulated optical signal into a first optical fiber of a fiber-optic cable of the optical transport link and to couple the second modulated optical signal into a different second optical fiber of said fiber-optic cable.

18. The apparatus of claim 9, wherein the electrical-to-optical converter comprises an optical modulator configured to generate the first modulated optical signal using a constellation in which all constellation points are located in a single quadrant of a complex plane defined with respect to an optical carrier.

19. The apparatus of claim 9, further comprising an optical receiver that comprises:

an optical channel de-multiplexer coupled to the optical transport link and configured to split light received therethrough from the electrical-to-optical converter into a first light beam encoded with the first data and a second light beam encoded with the first data;

a first photodetector configured to generate a first electrical signal proportional to optical power of the first light beam;

a second photodetector configured to generate a second electrical signal proportional to optical power of the second light beam; and a digital signal processor configured to receive the first and second electrical signals and generate therefrom an estimate of the first data by estimating each of an in-phase component and a quadrature component of an electromagnetic field that encodes the first data in each of the first and second light beams.

20. An optical communication method comprising:

generating a first modulated optical signal having first data encoded therein for being optically transmitted using a first channel of an optical transport link; and generating a different second modulated optical signal having the first data encoded therein for being optically transmitted using a different second channel of the optical transport link; and wherein the generating is performed in a manner that causes an optical carrier of the first modulated optical signal and an optical carrier of the second modulated optical signal to have a fixed relative phase offset of approximately $m\pi/2$ radian, where m is a positive or negative odd integer.

* * * * *